US009175659B2

(12) United States Patent
Benz et al.

(10) Patent No.: US 9,175,659 B2
(45) Date of Patent: Nov. 3, 2015

(54) DRIVE TRAIN OF A MOTOR VEHICLE HAVING AN INTERNAL COMBUSTION ENGINE AND A STARTER GENERATOR

(71) Applicant: Dr. Ing. h.c. F. Porsche Aktiengesellschaft, Stuttgart (DE)

(72) Inventors: Wolfgang Benz, Leinfelden-Echterdingen (DE); Stephan Mueller, Leonberg (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 0 days.

(21) Appl. No.: 14/078,678

(22) Filed: Nov. 13, 2013

(65) Prior Publication Data

US 2014/0137701 A1 May 22, 2014

(30) Foreign Application Priority Data

Nov. 16, 2012 (DE) ......................... 10 2012 111 034

(51) Int. Cl.

| | |
|---|---|
| ***B60W 10/10*** | (2012.01) |
| ***F02N 11/04*** | (2006.01) |
| ***F02N 11/00*** | (2006.01) |
| ***F02N 15/02*** | (2006.01) |

(52) U.S. Cl.

CPC .............. *F02N 11/04* (2013.01); *F02N 11/003* (2013.01); *F02N 15/02* (2013.01); *F02N 15/022* (2013.01); *F02N 15/023* (2013.01); *Y10T 74/134* (2015.01)

(58) Field of Classification Search

CPC .......................... B60K 2006/268; B60K 6/383
USPC ............................... 180/65.285, 65.25, 65.27
See application file for complete search history.

(56) References Cited

U.S. PATENT DOCUMENTS

| | | | | |
|---|---|---|---|---|
| 5,839,533 | A * | 11/1998 | Mikami et al. | 180/165 |
| 6,634,247 | B2 * | 10/2003 | Pels et al. | 74/329 |
| 7,357,204 | B2 * | 4/2008 | Hisada et al. | 180/65.285 |
| 7,819,212 | B2 * | 10/2010 | Kawasaki | 180/65.265 |
| 2010/0324762 | A1 * | 12/2010 | Imaseki et al. | 701/22 |
| 2011/0083916 | A1 * | 4/2011 | Cimatti et al. | 180/65.22 |
| 2011/0125353 | A1 * | 5/2011 | Komeda et al. | 701/22 |
| 2011/0172044 | A1 * | 7/2011 | Venturi | 475/5 |
| 2012/0021861 | A1 * | 1/2012 | Sakai et al. | 475/5 |
| 2012/0203405 | A1 * | 8/2012 | Wang et al. | 701/22 |
| 2012/0306457 | A1 * | 12/2012 | Haggerty et al. | 322/29 |
| 2012/0309585 | A1 * | 12/2012 | Whitney et al. | 477/5 |
| 2013/0006453 | A1 * | 1/2013 | Wang et al. | 701/22 |
| 2013/0190957 | A1 * | 7/2013 | Munsell et al. | 701/22 |
| 2014/0102253 | A1 * | 4/2014 | Benz et al. | 74/7 C |

(Continued)

*Primary Examiner* — Jeffrey J Restifo
(74) *Attorney, Agent, or Firm* — Gerald E. Hespos; Michael J. Porco; Matthew T. Hespos

(57) ABSTRACT

A drive train (1) of a motor vehicle has an internal combustion engine (2) with a crankshaft (6). A transmission (3) is connected downstream for driving at least one axle (5) of the motor vehicle. A starter generator (9) is attached to the crankshaft (6) of the internal combustion engine (2) via a spur gear mechanism (10). The spur gear mechanism (10) has a first drive train (11) with a switchable clutch (12) and a second drive train (13) with a switchable clutch or a freewheel (14) that is active during the starter mode of the starter generator (9). In a drive train of this type, the components for transmitting the torque of the starter generator (9) require only little space and, during starting, the crankshaft (6) of the internal combustion engine is decoupled from tensile forces and weights which would be observed when a belt drive is used.

14 Claims, 6 Drawing Sheets

(56) References Cited

U.S. PATENT DOCUMENTS

2014/0137701 A1* 5/2014 Benz et al. .................... 74/7 C
2014/0171260 A1* 6/2014 Dalum ........................... 477/5
2015/0008057 A1* 1/2015 Lo et al. ...................... 180/165
2015/0038288 A1* 2/2015 Holmes et al. ................. 477/5

* cited by examiner

DRIVE TRAIN OF A MOTOR VEHICLE HAVING AN INTERNAL COMBUSTION ENGINE AND A STARTER GENERATOR

CROSS REFERENCE TO RELATED APPLICATION

This application claims priority under 35 USC 119 to German Patent Appl. No. 10 2012 111 034.4 filed on Nov. 16, 2012, the entire disclosure of which is incorporated herein by reference.

BACKGROUND

1. Field of the Invention

The invention relates to a drive train of a motor vehicle, having an internal combustion engine with a crankshaft, a transmission connected downstream for driving at least one axle of the motor vehicle, and a starter generator assigned to the internal combustion engine.

2. Description of the Related Art

An electrically operated starter generator operates as a motor when starting the internal combustion engine and is suitable during operation of the drive train as a mild hybrid for driving the axle of the motor vehicle together with the internal combustion engine. In the generator mode, the starter generator is driven by the internal combustion engine and/or via the axle of the motor vehicle.

EP 1 079 085 A2 discloses a drive train of the type mentioned above and has a starter generator connected to the crankshaft of the internal combustion engine via a flexible drive mechanism configured as a belt drive. The belt drive also drives various auxiliary units of the internal combustion engine. However, due to the use of the belt drive, the crankshaft is not decoupled from tensile belt forces and weight loading.

U.S. Pat. No. 6,024,667 and DE 198 46 029 A1 describe mechanisms that are active in an infinitely variable manner in drive trains of motor vehicles, in the field of auxiliary units of an internal combustion engine.

DE 10 2009 001 147 A1 describes a drive train of a motor vehicle having an internal combustion engine, a retarder controller and an electric machine.

It is an object of the invention to provide a drive train where the components for transmitting the torque of the starter generator require only little space and, during starting, the crankshaft of the internal combustion engine is decoupled from tensile forces and weights as a consequence of the starting operation.

SUMMARY OF THE INVENTION

The invention relates to a motor vehicle drive train with a starter generator attached to the crankshaft of an internal combustion engine via a spur gear mechanism. The spur gear mechanism has a first drive train with a switchable clutch, and a second drive train with a switchable clutch or a freewheel that is active during the starter mode of the starter generator.

The two drive trains of the spur gear mechanism can control different operating states of both the internal combustion engine and the motor vehicle drive train in an optimum manner. The spur gear mechanism enables the drive trains to fit in a small space between the starter generator and the internal combustion engine or the internal combustion engine and the starter generator. Torques between the starter generator and the internal combustion engine or the internal combustion engine and the starter generator are transmitted directly via the two-stage spur gear mechanism. Thus, there is no need for a flexible drive mechanism, such as a belt drive, in this torque flow.

A flexible drive mechanism, such as a belt drive, is provided in the motor vehicle drive train when the internal combustion engine is assigned auxiliary units. The auxiliary units are attached to the flexible drive or the belt drive. In this case, a drive shaft of a toothed pulley or belt pulley of the flexible drive mechanism or the belt drive represents a shaft in the flow of torque between the starter generator and the spur gear mechanisms. This design therefore is distinguished by the fact that the crankshaft of the internal combustion engine is decoupled from tensile forces and weights of the flexible drive mechanism or belt drive. The components for transmitting the torque of the starter generator therefore require little space and during starting of the internal combustion engine, the crankshaft of the internal combustion engine is decoupled from tensile forces and weights that result from the drive of the auxiliary units.

The drive train preferably is developed to drive the auxiliary units of the internal combustion engine independently of the internal combustion engine. The auxiliary units are, for example, a coolant pump, a mechanical refrigerant compressor and/or a hydraulic pump. These auxiliary units already can be operated by the starter generator before the internal combustion engine is started. For this purpose, it is necessary merely to open the switchable clutch that is assigned to the first drive train. The second drive train also may be assigned a clutch that is switched externally. However, that clutch also is to be opened. A freewheel could be provided instead of a clutch. This is immaterial with respect to starting the internal combustion engine if the freewheel is arranged to transmit torque only during the starter mode of the starter generator.

Switchable clutches can be assigned to both the first drive train and the second drive train. However, both clutches can never be closed at the same time. It is thus to be assumed that the two separate drive trains have different transmission ratios.

The clutch assigned to the first drive train is closed to achieve favorable cold starting of the internal combustion engine in this drive train via a favorable transmission ratio that is relatively high. Under this aspect, that gear stage of the spur gear mechanism that is activated when the clutch of the first drive train is closed has a higher transmission ratio than the gear stage that is activated when the clutch of the second drive train is closed. Starting preferably is carried out by the second drive train, that is to say when the clutch assigned to the second drive train is closed and the clutch assigned to the first drive train is open, whenever the internal combustion engine is to be started warm and when a lower transmission ratio is sufficient.

The spur gear mechanism preferably has a first shaft with a first gearwheel and a second gearwheel that may be coupled by the switchable clutch of the first drive train. The spur gear mechanism also preferably has a second shaft with a third gearwheel and a fourth gearwheel that may be coupled by the switchable clutch of the second drive train or coupled only if torque is transmitted via the crankshaft as a consequence of the freewheel. The spur gear mechanism is configured so that first the first and third gearwheels mesh with one another, and second the second and fourth gearwheels mesh with one another.

The above-described spur gear mechanism enables the crankshaft of the internal combustion engine to interact directly, for example, with the first shaft. The crankshaft of the internal combustion engine also can interact indirectly with the first shaft via a gearwheel that is connected to the crankshaft and meshes with the first gearwheel.

The spur gear mechanism can be arranged in different regions of the internal combustion engine. For instance, the spur gear mechanism can be arranged in the region of an output side of the internal combustion engine. Alternatively, the spur gear mechanism can be arranged in the region of the free end of the internal combustion engine, which free end is remote from the output side of the internal combustion engine.

The auxiliary units are attached to a belt drive that can be driven by the starter generator and/or the internal combustion engine. In this case, the starter generator may have an output shaft connected fixedly to a belt pulley of the belt so as to rotate therewith and may be connected fixedly to a shaft of the spur gear mechanism to rotate therewith. Alternatively, the starter generator can have a first output shaft connected fixedly to a belt pulley of the belt drive to rotate therewith and a second output shaft connected fixedly to a shaft of the spur gear mechanism so as to rotate therewith. This variant is used when the spur gear mechanism and the belt drive are arranged on sides of the internal combustion engine that face away from one another. In principle, the spur gear mechanism and the belt drive can be arranged on the same side of the internal combustion engine.

The invention preferably has a spur gear mechanism with two stages on the output side or at the free end of the internal combustion engine. Thus, the internal combustion engine can be started with a high transmission ratio when the clutch is closed. Two transmission ratios can be switched for driving the auxiliary units. Thus, the auxiliary units can be driven by the starter generator independently of the internal combustion engine. The auxiliary units preferably are driven by the belt drive. The torque of the starter generator is introduced into the crankshaft of the internal combustion engine via a toothing system of the spur gear mechanism. Thus, higher torques can be introduced than with the belt drive. Moreover, the crankshaft is decoupled from tensile belt forces and weight loading. Only one element that can be switched actively is required in the configuration of one clutch and one freewheel, namely the clutch that is capable of power shifting. In addition, the drive train of the invention requires only one tap-off at the crankshaft and only one electric machine in the manner of the starter generator is required. Utilization of the space can be optimized by integrating components into the installation space of the transmission if the spur gear mechanism is on the side of the internal combustion engine that faces the transmission that is connected downstream of the internal combustion engine. The use of a spur gear mechanism makes great structural design freedom possible in the selection of the transmission ratio.

If the first drive train has the switchable clutch and the second drive train has the freewheel that is active during the starter mode of the starter generator, then starting of the internal combustion engine can take place only when the clutch of the first drive train is closed. In this case, it is otherwise not possible, on account of the freewheel, to introduce a starting torque into the crankshaft of the internal combustion engine via the starter generator. In this variant, the freewheel is overrun as the rotational speed of the started internal combustion engine increases. As a result, the auxiliary units and the starter generator are driven via the crankshaft of the internal combustion engine.

The drive train makes boosting possible by operating the starter generator during driving with the internal combustion engine. The starter generator therefore is active in its function as motor and, if the freewheel is used in one drive train, the starter generator introduces an additional torque into the crankshaft via the other drive train at least when the clutch of the other drive train is closed. If two switchable clutches are used in the two separate drive trains, the additional torque can be introduced into the crankshaft either via the first drive train or via the second drive train.

The configuration of the drive train makes it possible to increase the power output of the internal combustion engine, and therefore is advantageous in the sport mode. In said sport mode, the two clutches are opened the auxiliary units are not driven briefly. Accordingly, both the starter generator and the auxiliary units are decoupled from the internal combustion engine, with the result that the internal combustion engine does not have to produce the power for driving the auxiliary units. The full power output of the internal combustion engine therefore is available for moving the vehicle.

The drive train of the invention therefore requires only one single electric machine in the manner of the starter generator that can be operated as a motor or as a generator. The auxiliary units can be driven with two transmission ratios. The drive of the auxiliary units takes place either via the first drive train or via the second drive train.

The first drive train optionally also can have a further switchable clutch for connecting the first shaft to the transmission when the first shaft is decoupled from the crankshaft. The transmission is connected downstream of the internal combustion engine. The further clutch makes it possible to tap off power on the output side of the drive train and permits operation of the auxiliary units with kinetic energy from the rolling vehicle when the crankshaft is at a standstill to achieve secondary recuperation. Electric driving is possible given sufficient dimensioning of the starter generator. Stepped-up towed starting of the internal combustion engine also is possible.

Further features of the invention will become apparent from the following description of the preferred embodiments and the drawings.

DETAILED DESCRIPTION OF THE PREFERRED EMBODIMENTS

Figure 1:
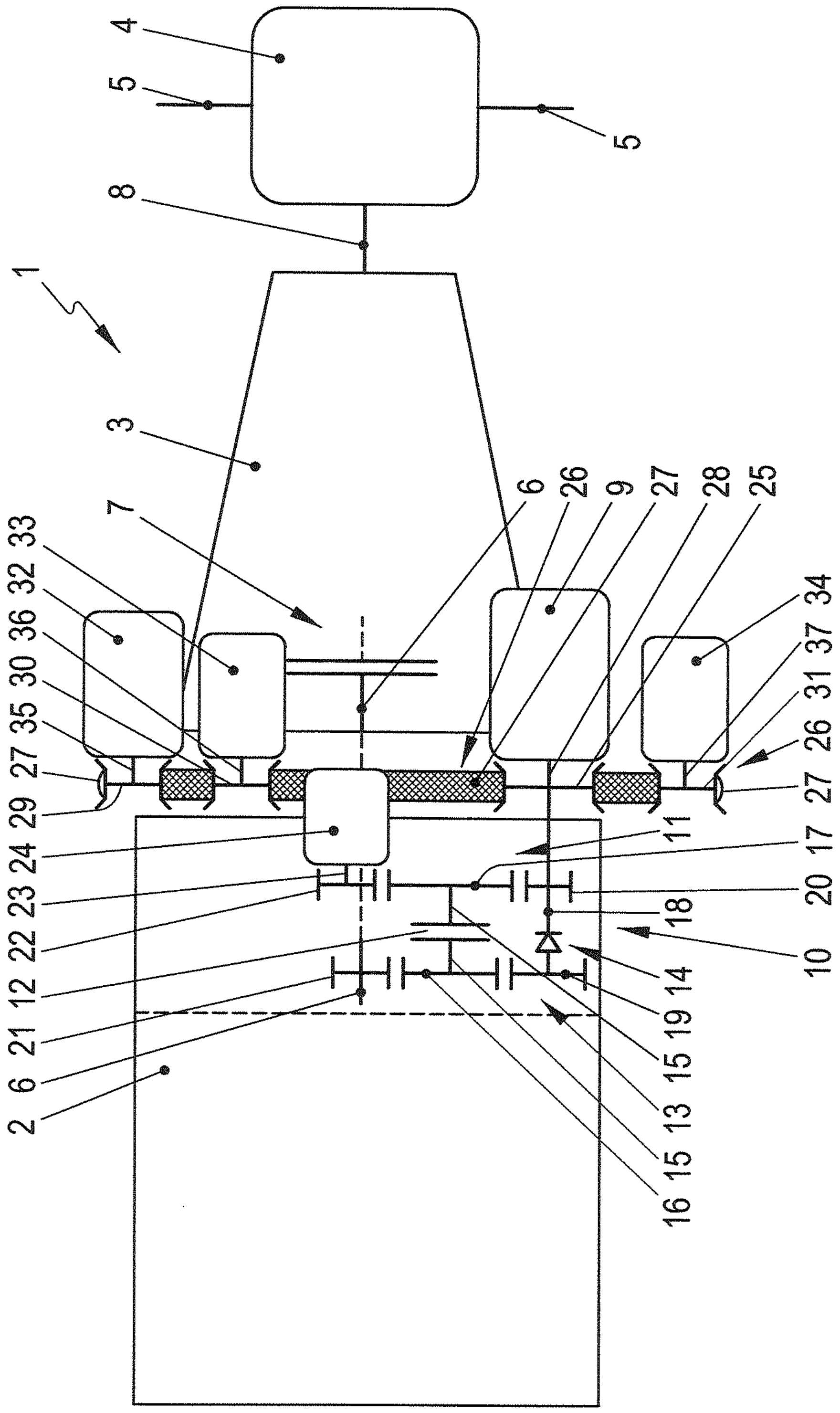
FIG. 1 is an outline illustration of a first embodiment of the drive train of the invention.

A drive train according to a first embodiment of the invention is identified generally by the numeral 1 in FIG. 1. The drive train 1 has an internal combustion engine 2 with a transmission 3 connected downstream thereof and a differential 4 that is connected downstream of the transmission 3 for driving an axle 5 of the motor vehicle. A crankshaft 6 of the internal combustion engine 2 is connected via a switchable clutch 7 to a transmission shaft 8 that interacts with the differential 4.

A starter generator 9 is attached to the crankshaft 6 of the internal combustion engine 2 via a spur gear mechanism 10 that has two stages. The spur gear mechanism 10 is in a region of the output side of the internal combustion engine 2.

A first drive train 11 of the spur gear mechanism 10 has a switchable clutch 12. A second drive train 13 of the spur gear mechanism 10 has a freewheel 14 that is active during the starter mode of the starter generator 9.

The spur gear mechanism 10 has a first shaft 15 to which gearwheels 16 and 17 are connected fixedly so as to rotate with the shaft 15. The shaft 15 is interrupted and can be coupled by the clutch 12 of the drive train 11. A second shaft 18 of the spur gear mechanism 10 receives gearwheels 19 and 20 fixedly so that they rotate therewith. The shaft 18 also is divided and the two gearwheels 19 and 20 can be coupled when the shaft 18 is driven via the gearwheel 19, as can be gathered from the symbolic illustration of the freewheel 14. The spur gear mechanism 10 is designed so that the gearwheels 16 and 19 are arranged on the side of the spur gear mechanism 10 that faces the internal combustion engine 2 and the gearwheels 17 and 20 are arranged on the side of the spur gear mechanism 10 that is remote from the internal combustion engine 2.

A further gearwheel 21 is connected fixedly to the crankshaft 6 so as to rotate therewith and meshes with the gearwheel 16. A further gearwheel 22 is connected fixedly to a drive shaft 23 of an engine oil pump 24 so as to rotate therewith and meshes with the gearwheel 17.

The shaft 18 is guided out of the spur gear mechanism 10 on the side of the gearwheel 20 that is remote from the freewheel 19 and receives a belt pulley 25 of a belt drive 26 in a fixed manner so that said belt pulley 25 rotates therewith. The belt drive 25 has a belt 27. The shaft 18 is extended beyond the belt pulley 25 and is connected fixedly to a shaft 28 of the starter generator 9 so as to rotate therewith.

The belt drive 26 has at least three further belt pulleys 29, 30 and 31 in addition to the belt pulley 25, and the belt 27 wraps around the belt pulleys 25, 29, 30 and 31. The internal combustion engine 2 is assigned a mechanical refrigerant compressor 32, a coolant pump 33 and a hydraulic pump 34 for the transmission 3 and mechanism 10, as auxiliary units. The auxiliary units are arranged on the side of the spur gear mechanism 10 that faces the transmission 3 and are mounted in the structural unit that is formed from the internal combustion engine 2, the transmission 3 and the spur gear mechanism 10. The belt pulley 29 is connected fixedly to a shaft 35 of the refrigerant compressor 32 so as to rotate therewith, the belt pulley 30 is connected fixedly to a shaft 36 of the coolant pump 33 so as to rotate therewith, and the belt pulley 31 is connected fixedly to a shaft 37 of the hydraulic pump 34 so as to rotate therewith.

The rotational axis of the crankshaft 6 and the various shafts of the spur gear mechanism 10 and the various shafts of the belt drive 26 and of the auxiliary units are arranged parallel to one another. The diameter of the gearwheel 20 is considerably smaller than the diameter of the gearwheel 17, whereas the diameters of the gearwheels 16 and 19 are approximately identical.

The belt drive 26 is operated via said starter generator 9 if the starter generator 9 is operated in the motor mode, and therefore the refrigerant processor 32, the coolant pump 33 and the hydraulic pump 34. These auxiliary units therefore also can be operated when the internal combustion engine 2 is at a standstill.

The internal combustion engine 2 can be started merely by operating the starter generator 9 in the motor mode and closing the clutch 12 in the first drive train 11. A very high torque for starting the internal combustion engine 2 therefore is introduced into the crankshaft 6 by the first drive train 11 of the spur gear mechanism 10 due to the relatively high transmission ratio. The high torque is particularly advantageous during starting of the internal combustion engine 2 in the case of cold starting.

When the internal combustion engine 2 has been started, the rotational speed of the crankshaft 6 is increased. As a result, the gearwheel 19 rotates with a higher rotational speed than the gearwheel 20, and a torque is introduced into the belt pulley 25 of the belt drive 26 via the second drive train 13, accordingly the gearwheel 19, whereby the belt drive 26 and therefore the auxiliary units are driven by the internal combustion engine 2. The first drive train 11 has a different transmission ratio than the second drive train 13, and hence the auxiliary units can be driven with different transmission ratios.

Figure 2:
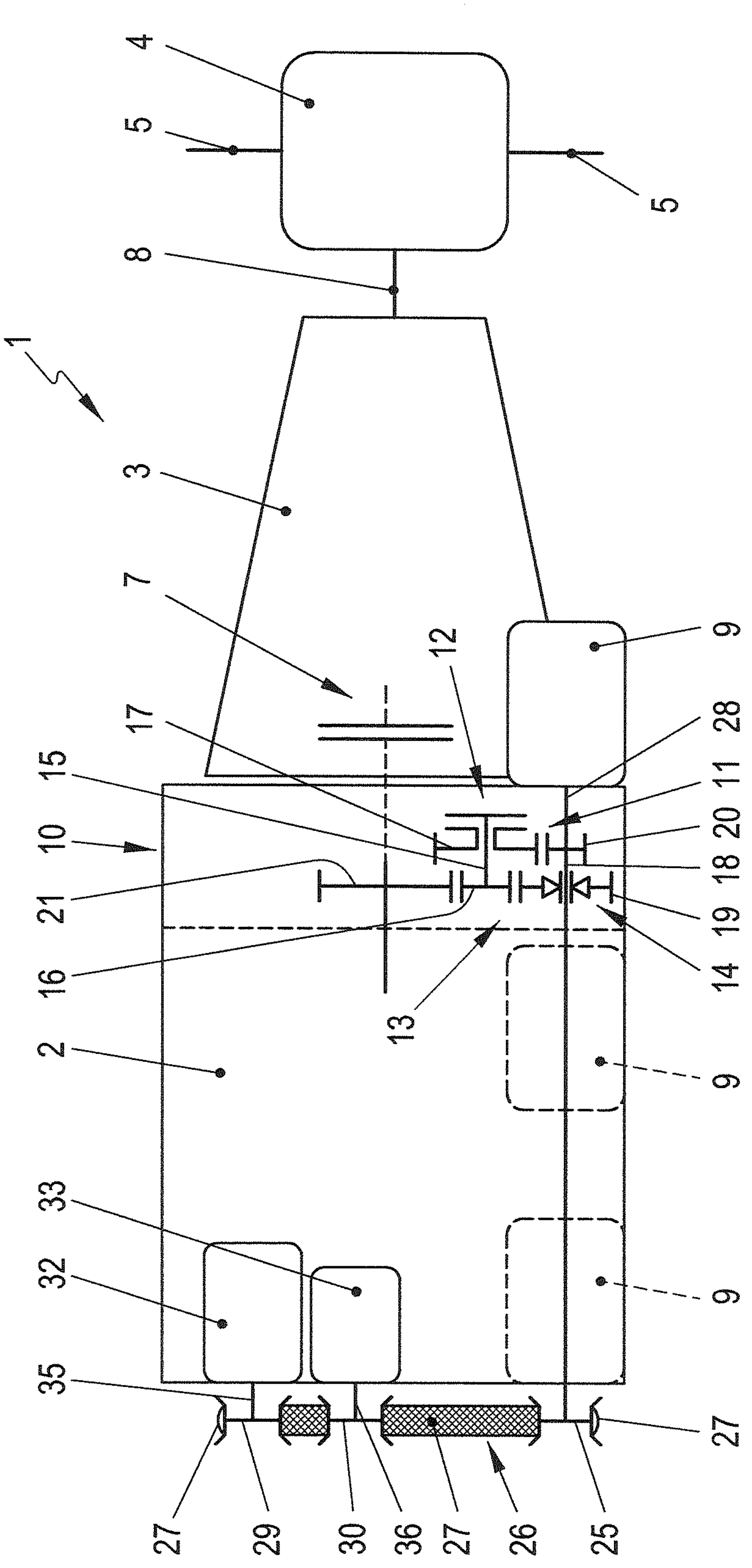
FIG. 2 is an outline illustration of a second embodiment of the drive train of the invention.

The embodiment of FIG. 2 differs from that according to FIG. 1 only in that the belt drive 26 and the auxiliary units are not arranged in the region between the spur gear mechanism 10 and the transmission 3, but rather are arranged on that side of the internal combustion engine 2 that is remote from the transmission 3, that is to say in the region of the free end of the internal combustion engine 2. Parts that coincide with the embodiment of FIG. 1 are denoted by the same designations in FIG. 2.

FIG. 2 illustrates that the shaft 18 of the spur gear mechanism 10 which is connected to the shaft 28 of the starter generator 9 is extended beyond the free end of the internal combustion engine 2 and is connected fixedly there to the belt pulley 25 so as to rotate therewith. The drive of the auxiliary units takes place via the belt pulley 25, specifically the mechanical refrigerant compressor 32 and the coolant pump 33 in this case. No hydraulic pump is illustrated in the embodiment of FIG. 2.

In FIG. 2, the two further positions of the starter generator 9 shown by dashed lines indicate that the starter generator 9 can be at different locations along the shaft 18 that leads to the free end of the internal combustion engine 2. For instance, one modification shows that the starter generator 9 can be arranged on that side of the spur gear mechanism 10 that is adjacent to the gearwheel 19. The other alternative shows the arrangement of the starter generator 9 immediately adjacently to the free end of the internal combustion engine 2 and immediately adjacently to the belt pulley 25.

The method of operating the drive train 1 of FIG. 2 corresponds to that of FIG. 1.

Figure 3:
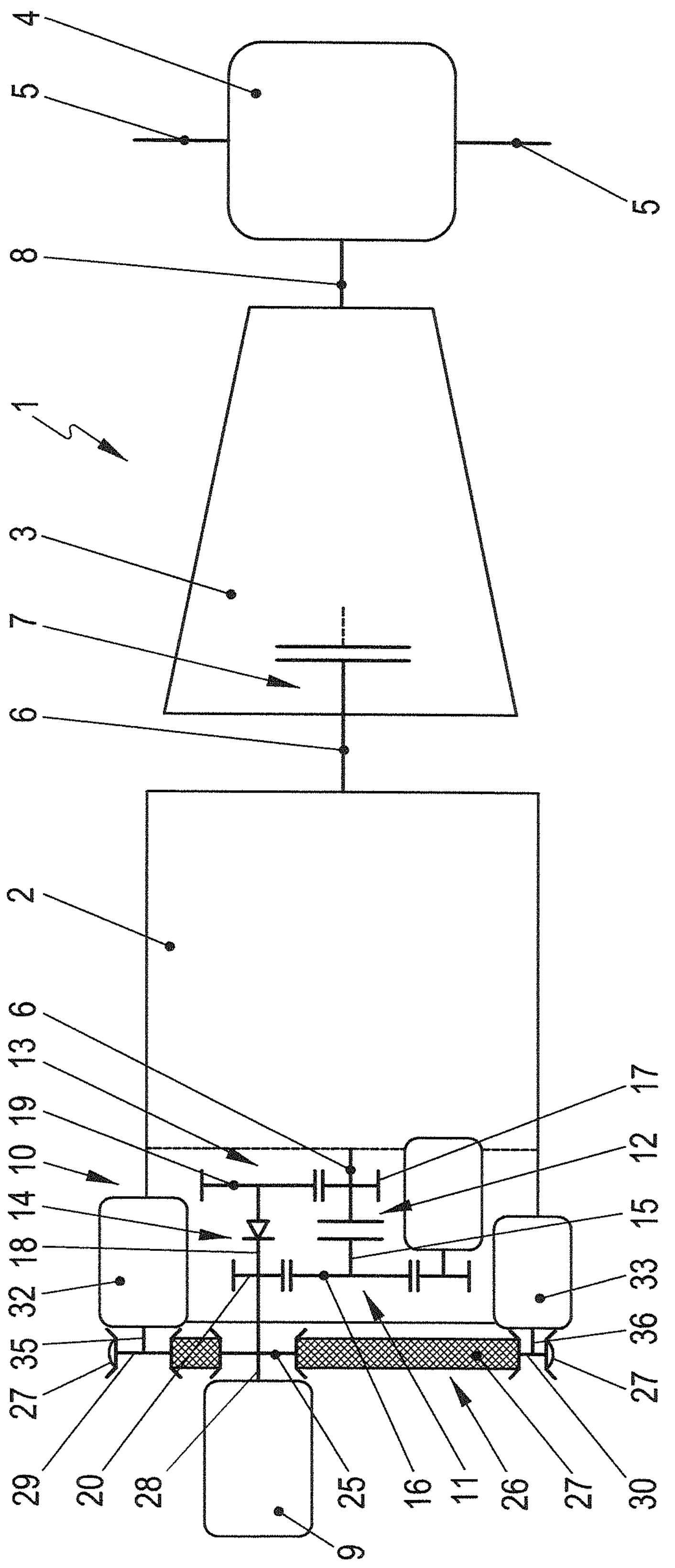
FIG. 3 is an outline illustration of a third embodiment of the drive train of the invention.

The embodiment of FIG. 3 differs from that of FIG. 1 essentially in that both the spur gear mechanism 10 and the starter generator 9 with belt drive 26 and the auxiliary units that are assigned to the belt drive 26 are arranged in the region of the free end of the internal combustion engine 2 that is remote from the transmission 3. This variant is advantageous when the space conditions make it necessary for the components not to be arranged between the internal combustion engine 2 and the transmission 3.

Parts of the embodiment of FIG. 3 that coincide with the embodiment of FIG. 1 are denoted by the same designations.

The methods of operation of the drive trains 1 of the embodiments of FIGS. 1 and 3 are identical. No hydraulic pump 34 is provided in the embodiment of FIG. 3.

Apart from the differences that will be explained in the following text, the embodiment of FIG. 4 corresponds to the embodiment according to FIG. 2. Parts of the exemplary embodiment of FIG. 4 that coincide with the embodiment of FIG. 2 are denoted by the same designations.

Figure 4:
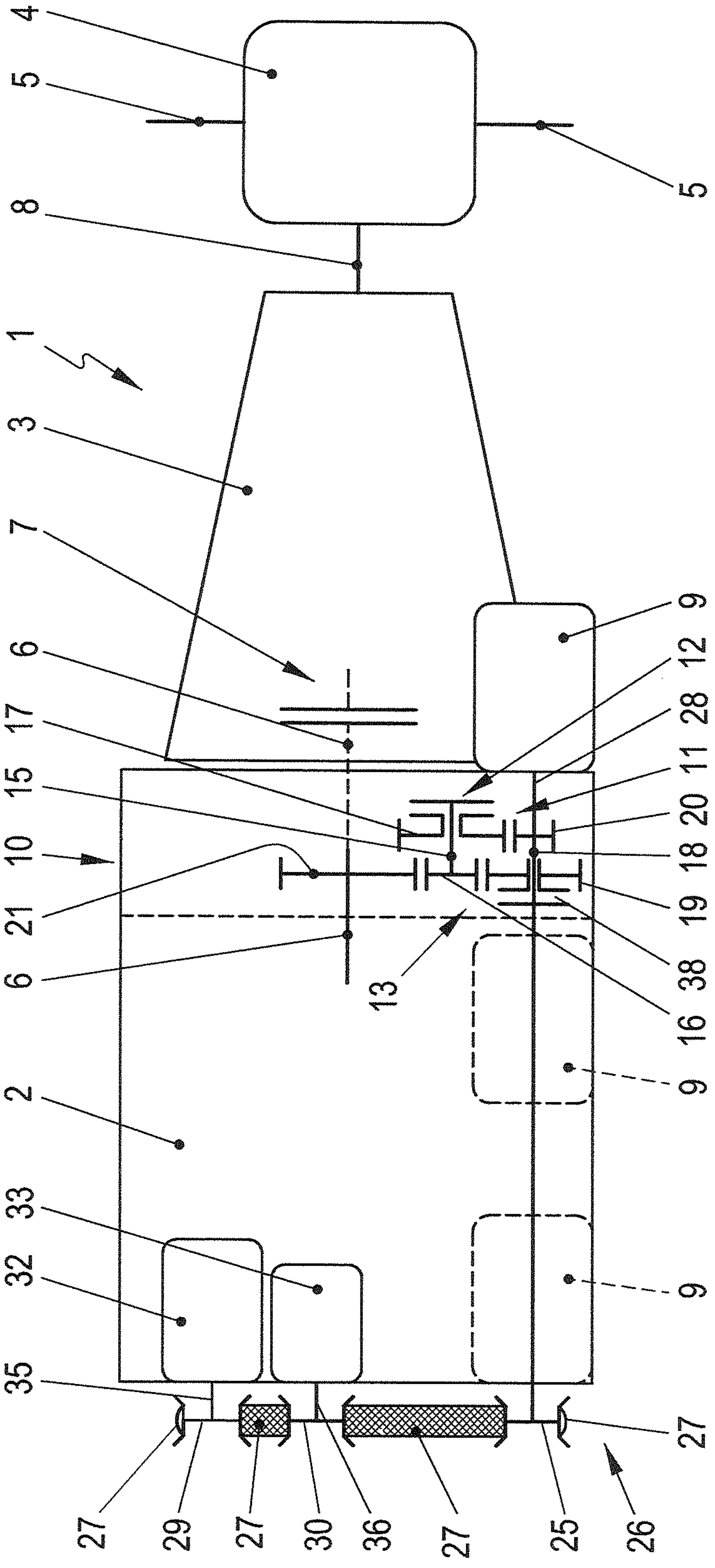
FIG. 4 is an outline illustration of a fourth embodiment of the drive train of the invention.

In the embodiment of FIG. 4, instead of the freewheel 14, a switchable clutch 38 is provided so that the shaft 18 of the spur gear mechanism 10 can be connected fixedly to the gearwheel 19 to rotate therewith. The further clutch 38 permits the internal combustion engine 2 to be started via the second drive train 13 when the clutch 38 is closed and the clutch 12 is open. A transmission ratio effected here is lower than in the case of starting via the first drive train 11. Starting via the second drive train 13 can be advantageous in the case of a warm engine.

It is always to be ensured that only one of the two clutches 12 and 38 is opened. Furthermore, the design enables boosting with a low transmission ratio via the second drive train 13. The starter generator 9 therefore can introduce an additional torque to the torque of the internal combustion engine 2 into the crankshaft 6 in the motor mode. In addition, this variant with the two clutches 12 and 38 makes an increase in the power output at the differential 4 possible, by having neither of the auxiliary units being driven by the internal combustion engine 2, nor having the starter generator 9 attached when both clutches 12, 38 are open. An increased power output of the internal combustion engine 2 is therefore available briefly.

An arrangement of the starter generator 9 at different locations, as indicated with respect to the embodiment of FIG. 2, is also possible in the embodiment of FIG. 4.

Figure 5:
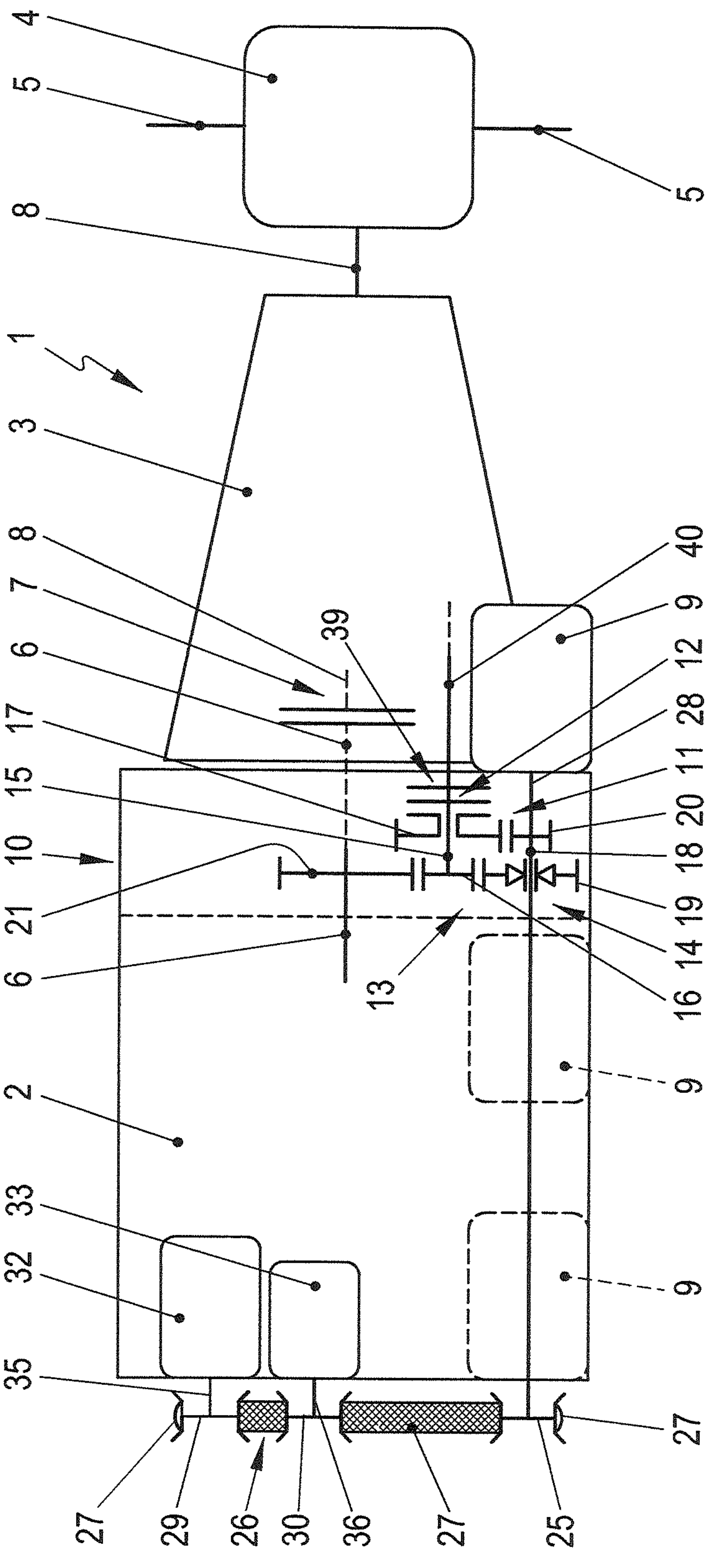
FIG. 5 is an outline illustration of a fifth embodiment of the drive train of the invention.

The embodiment of FIG. 5 differs from that of FIG. 2 only in that a double action clutch is provided instead of the clutch 12, or else a further clutch 39 that interacts with an additional shaft 40 of the transmission 3 is provided in addition to the clutch 12. The third clutch 39 or double action clutch makes it possible to tap off power on the output side of the drive train 1. It permits the operation of the auxiliary units, in the present case the mechanical refrigerant compressor 32 and the coolant pump 33, by kinetic energy of the rolling vehicle (secondary recuperation) when the crankshaft 6 is at a standstill. Furthermore, electric driving exclusively by the starter generator 9 is possible given sufficient dimensioning of the starter generator 9. In addition, a stepped-up towed start of the internal combustion engine 2 is possible.

Figure 6:
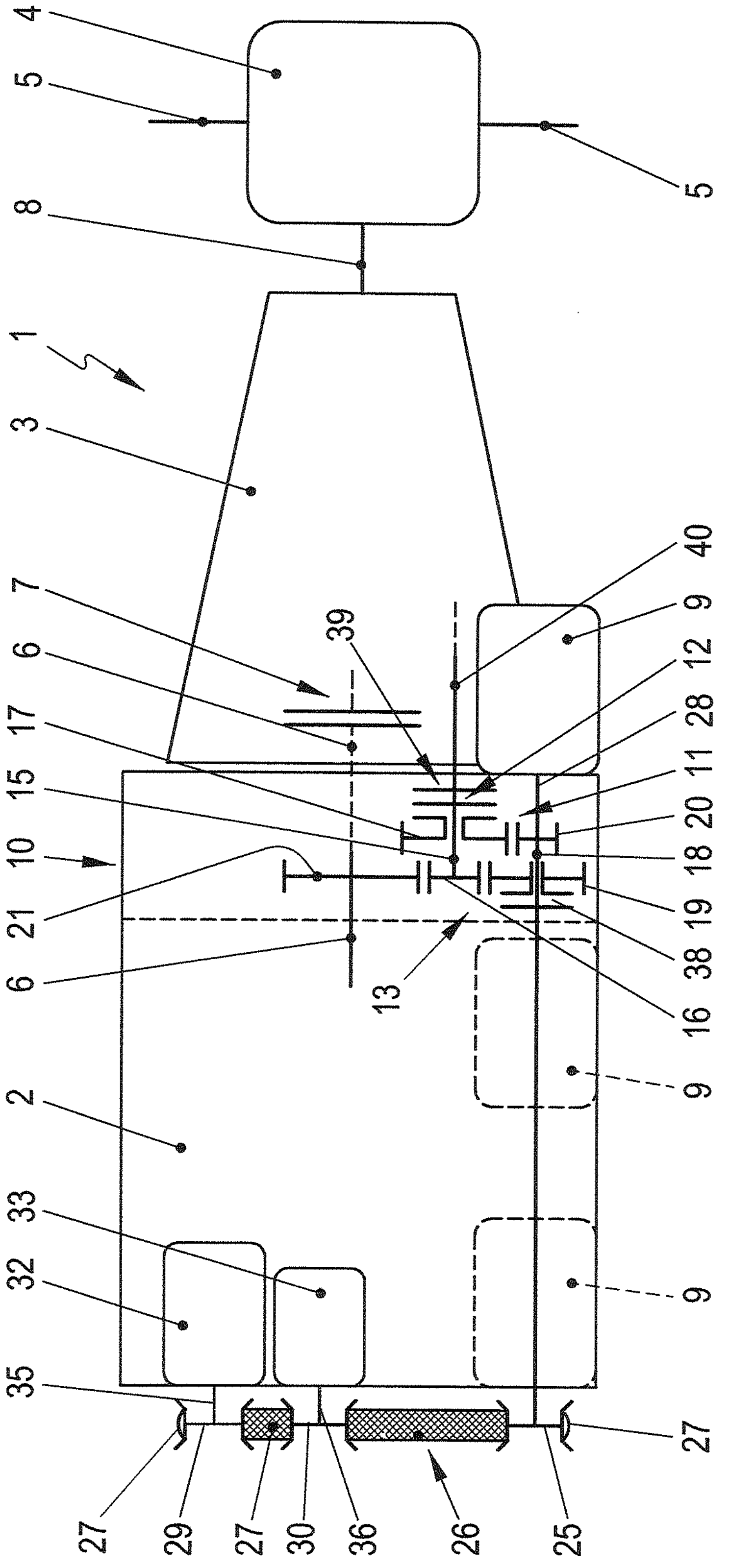
FIG. 6 is an outline illustration of a sixth embodiment of the drive train of the invention.

These additional functions, compared with the embodiment of FIG. 2, also can be observed in the embodiment of FIG. 6. The embodiment of FIG. 6 differs from that of FIG. 5 only in that the freewheel 14 is provided instead of the clutch 38.

Parts of the exemplary embodiments according to FIGS. 5 and 6 which coincide with the exemplary embodiment according to FIGS. 1 and 2 are denoted by the same designations.

What is claimed is:

1. A drive train of a motor vehicle, comprising: an internal combustion engine that has a crankshaft with a crankshaft gear; a transmission connected downstream of the internal combustion engine, the transmission being drivable by the crankshaft and being operable for driving at least one axle of the motor vehicle; a spur gear mechanism connectable to the crankshaft gear; a starter generator attached to the spur gear mechanism, the spur gear mechanism having first and second drive trains, the first drive train of the spur gear mechanism having a first transmission ratio and being provided with a first switchable clutch that can be closed for connecting the first drive train to the crankshaft gear, and the second drive train of the spur gear mechanism having a second transmission ratio different from the first transmission ratio and being provided with a second switchable clutch or a freewheel that is active only when the first switchable clutch is open for connecting the second drive train to the crankshaft gear during a starter mode of the starter generator; and auxiliary units attached to a belt drive that can be driven selectively by one of the starter generator and the internal combustion engine.

2. The drive train of claim 1, wherein the spur gear mechanism is arranged in a region of an output side of the internal combustion engine or in a region of a free end of the internal combustion engine that is remote from an output side of the internal combustion engine.

3. The drive train of claim 1, wherein the starter generator has an output shaft connected fixedly to a belt pulley of the belt drive so as to rotate therewith and connected fixedly to a shaft of the spur gear mechanism so as to rotate therewith.

4. The drive train of claim 1, wherein the starter generator has first and second output shafts, the first output shaft being connected fixedly to a belt pulley of the belt drive so as to rotate therewith and the second output shaft being connected fixedly to a shaft of the spur gear mechanism so as to rotate therewith.

5. The drive train of claim 1, wherein the spur gear mechanism and the belt drive are arranged on the same side of the internal combustion engine or on sides of the internal combustion engine that face away from one another.

6. The drive train of claim 1, wherein the spur gear mechanism has a first shaft with a first gearwheel and a second gearwheel, the switchable clutch being operable for selectively coupling the first and second gearwheels, and the spur gear mechanism further has a second shaft with a third gearwheel and a fourth gearwheel, the switchable clutch of the second drive train being operable for selectively coupling the third and fourth gearwheels or to be coupled only in the case of a transmission of torque via the crankshaft as a consequence of the freewheel, so that the first gearwheel and the third gearwheel mesh with one another, and the second gearwheel and the fourth gearwheel mesh with one another.

7. The drive train of claim 6, wherein the crankshaft of the internal combustion engine interacts directly with the first shaft or indirectly with the first shaft via a gearwheel that is connected to the crankshaft and meshes with the first gearwheel.

8. The drive train of claim 1, wherein the gear stage of the spur gear mechanism that is activated when the clutch of the first drive train is closed has a higher transmission ratio than the gear stage when is activated when the clutch of the second drive train is closed.

9. The drive train of claim 1, wherein the first drive train has a further switchable clutch for connecting the first shaft to the transmission when the first shaft is decoupled with respect to the crankshaft.

10. The drive train of claim 1, wherein the spur gear mechanism and the belt drive are arranged on sides of the internal combustion engine that face away from one another.

11. The drive train of claim 1, wherein the spur gear mechanism is between the internal combustion engine and the transmission.

12. The drive train of claim 1, wherein the auxiliary units are driven by the starter generator when the first switchable clutch is open and the second switchable clutch or the freewheel is not engaged so that all power of the internal combustion engine is directed to the transmission for driving at least one axle of the motor vehicle.

13. The drive train of claim 1, wherein the starter generator is connected to the transmission and the at least one axle of the motor vehicle only via the crankshaft of the internal combustion engine.

14. The drive train of claim 1, wherein the first transmission ratio is higher than the second transmission ratio so that the first drive train delivers higher torque than the second drive train and is more suitable for cold starting.

* * * * *